June 10, 1941.  C. C. H. TOMMERUP  2,244,813
SANDING DEVICE
Filed May 17, 1939

INVENTOR
CARL C. H. TOMMERUP
BY
Hyde, Higley & Meyer
ATTORNEYS

Patented June 10, 1941

2,244,813

UNITED STATES PATENT OFFICE 2,244,813

SANDING DEVICE

Carl C. H. Tommerup, Lakewood, Ohio

Application May 17, 1939, Serial No. 274,098

1 Claim. (Cl. 51—34)

This invention relates to improvements in drill press attachments and more particularly to means for converting an ordinary drill press into a reciprocating sander, mixer, or the like.

A sanding drum may be fastened to the rotatable spindle of a drill press and work when held against the sander will be abraded but smooth work cannot be turned out unless the sanding drum is continually reciprocated so as to bring the score marks in different places each time producing an overlapping effect and a smooth finish on the work. My invention provides means whereby an ordinary drill press may be quickly, easily and cheaply transformed into a reciprocating sander.

My invention also provides structural means for changing a drill press into a reciprocating sander without in any serious way interrupting the use of the press for drilling purposes.

The novel features of my invention will be more clearly understood from the accompanying drawing and description and the essential features thereof will be set forth in the claims.

Figure 1:
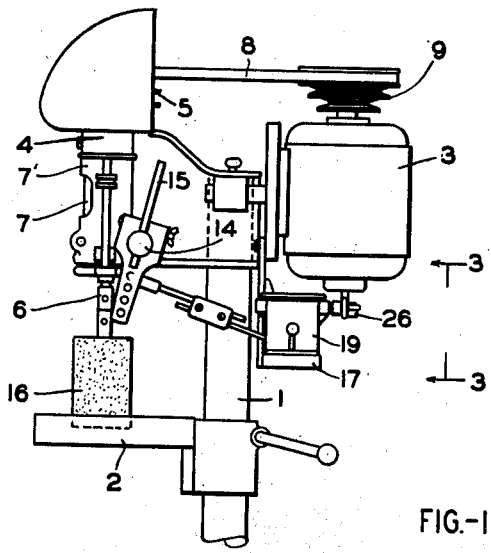
Figure 2:
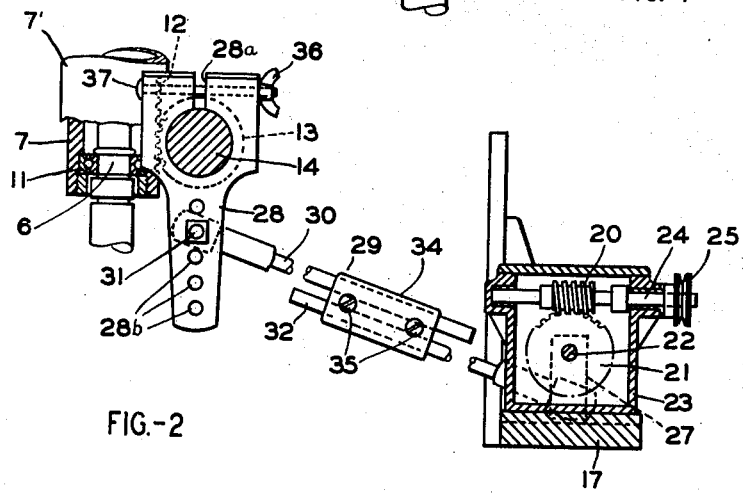
Figure 3:
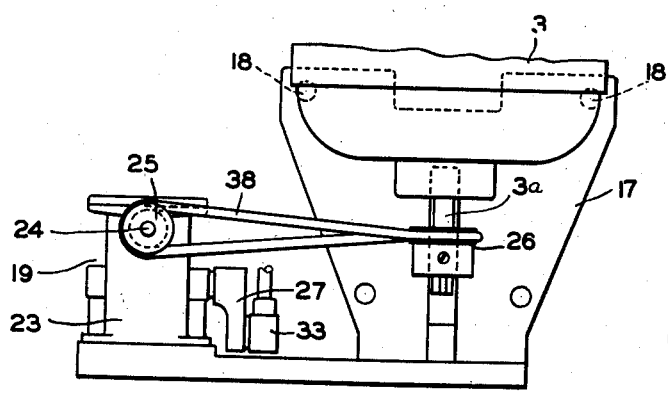

In the drawing, Fig. 1 is a side elevation of a portion of a drill press with my improved attachment in place; Fig. 2 is an enlarged view of a portion of the mechanism of Fig. 1 with certain of the parts broken away to more clearly illustrate the operation thereof; while Fig. 3 is an enlarged view of a portion of the apparatus of Fig. 1 taken substantially from the position of the line 3—3 thereof.

The drill press shown in these views is of a standard type having a frame 1 supporting a work table 2 and carrying at its upper end a supporting bracket for the drive motor 3 and for the spindle and driving means as shown at 4. It will be understood that the frame 1 is mounted on a suitable base which has nothing to do with the present invention.

It is necessary here to say very little about the drill press and its driving motor as my invention is applicable to any of the usual types of drill press. In the machine here shown a cone pulley 5 having bearings in the upper part of the frame head has a splined connection (not shown) with the spindle 6, to the lower end of which a drill is usually attached. The pulley 5 is driven by the belt 8 which passes over the cone pulley 9 mounted upon the motor shaft. Manually operated means is provided for feeding the drill spindle up and down. In the form here shown a quill 7 within the housing 7' carries suitable bearings such as those shown at 11 for rotatably mounting the spindle within the quill. The quill carries a rack 12 which meshes with a pinion 13 which in turn is rigidly mounted on feed shaft 14 which is oscillatable in suitable bearings in the frame. The usual handle 15 is provided for oscillating shaft 14 to feed the drill spindle up and down.

My improved apparatus quickly converts such a drill press into a reciprocating sander. A sanding drum 16 is secured to the lower end of spindle 6 in a position coaxial with the spindle so that the sanding drum is rotated when the motor 3 is operated to rotate the drill spindle. A bracket 17 of suitable material and form is connected to the press frame by suitable securing means indicated at 18. On the bracket 17 is mounted a speed reducing unit 19 comprising a worm 20 driven at high speed and which meshes with a worm wheel 21 which is thus driven at low speed to rotate shaft 22. These parts are all located within the housing 23 which is secured to the bracket 17. The worm 20 is mounted on shaft 24 which has suitable bearings in the housing 23. This shaft is driven by pulley 25 which has a belt connection with a pulley 26 which is mounted on the lower end of the shaft 3a of motor 3.

A suitable connection is provided between the speed reducing unit 19 and shaft 14 to continually oscillate shaft 14 when desired. Obviously, this connection might be of several types but in the embodiment here shown a crank arm 27 is rigidly secured to the slow speed shaft 22 of the speed reducing unit. A rocker arm 28 is detachably connected to shaft 14. A link 29 is then connected between the crank arm 27 and rocker arm 28 so that upon rotation of crank 27 the arm 28 is oscillated back and forth to feed the spindle 6 and the sanding drum 16 continuously up and down. Preferably the link 29 may be made adjustable longitudinally to take care of various conditions met with in the field. To this end the bar 30 pivotally connected to the arm 28 at 31 extends parallel to a bar 32 which is pivotally connected to the crank 27 at 33. Adjustable clamping means 34 is clamped together with screws or bolts 35 so as to hold the bars 30 and 32 in fixed relation to each other.

I find a very suitable rocker arm 28 may be formed of "Masonite" split at 28a as shown so as to embrace the shaft 14 fairly snugly and yet to oscillate freely on the shaft when the clamping wing nut 36 is loose. When this nut is tightened on bolt 37 then the arm 28 is firmly secured to the shaft 14 so that they oscillate together. A plurality of holes 28b may be formed in the arm 28 to permit a change in the length of stroke.

The parts here shown comprise a motor 3 of 1/3 H. P. revolving at 1750 R. P. M. carrying a 1 3/8 inch outside diameter pulley at 26 which drives a 1 inch outside diameter pulley 25. The speed reducing unit has a ratio of 40:1 so that the oscillating arm 28 makes approximately 60 complete strokes per minute. This gives a very smooth sanding operation on the drum 16. Obviously by changing pulleys other speeds may be obtained.

When the device is used as a drill press the wing nut 36 is slacked off so that oscillation of arm 28 will not move the shaft 14. If it is desired to stop the oscillation of the arm 28 then the belt 38 may be disconnected between pulleys 25 and 26. With a drill on spindle 6 the press may be used in the customary manner manipulating the spindle up and down by means of the handle 15. To convert it into a sander it is only necessary to remove the drill and attach the drum 16, replace the belt 38 and tighten the thumb screw 36. I have thus provided means which very quickly converts a drill press into a very satisfactory reciprocating sander. This is very advantageous for a person having a home workroom or a small shop which would not justify the spending of $100 or so for a separate reciprocating sanding machine which could be utilized for no other purpose.

The device here shown may be used as a mixer for paint or the like by simply replacing drum 16 with an L-shape bar or other mixer. The combined rotating and reciprocating motion obviously does a quicker and better job of mixing than can be done by rotating motion alone.

I regard it as within the scope of my invention to drive the speed reducing unit 19 from a small auxiliary motor if it is not feasible to connect it up with the shaft of the motor 3.

What I claim is:

In combination with a drill press having a frame, having a spindle mounted in said frame for rotation and for reciprocation axially, having a motor drivingly connected with said spindle to rotate it, and having manually operable means for reciprocating said spindle axially during rotation thereof, said means including an oscillatable feed shaft, a bracket attached to said frame, a speed reduction unit carried by said bracket, said unit having a high speed shaft carrying a pulley and having a low speed shaft carrying a crank arm, a pulley rotatable with the shaft of said motor, a driving belt connection between said pulleys, a rocker arm, said arm having a split portion embracing said feed shaft, quickly adjustable means for clamping said split portion to said shaft in frictional driving relation, and a link connecting said arms.

CARL C. H. TOMMERUP.